(12) United States Patent  (10) Patent No.: US 7,643,158 B2
Alexander  (45) Date of Patent: Jan. 5, 2010

(54) METHOD FOR SYNCHRONIZING THE OPERATION OF MULTIPLE DEVICES FOR GENERATING THREE DIMENSIONAL SURFACE MODELS OF MOVING OBJECTS

(75) Inventor: Eugene J. Alexander, San Clemente, CA (US)

(73) Assignee: Motion Analysis Corporation, Santa Rosa, CA (US)

( * ) Notice: Subject to any disclaimer, the term of this patent is extended or adjusted under 35 U.S.C. 154(b) by 0 days.

(21) Appl. No.: 11/543,680

(22) Filed: Oct. 4, 2006

(65) Prior Publication Data

US 2007/0076224 A1  Apr. 5, 2007

Related U.S. Application Data

(60) Provisional application No. 60/723,713, filed on Oct. 4, 2005.

(51) Int. Cl.
*G01B 11/24* (2006.01)

(52) U.S. Cl. .................... 356/601; 356/304; 356/610; 382/103; 382/254; 382/152

(58) Field of Classification Search ......... 356/601–610; 382/103–108, 254, 152–154
See application file for complete search history.

(56) References Cited

U.S. PATENT DOCUMENTS

| 4,965,667 A | * | 10/1990 | Trew et al. | 375/240.21 |
| 5,852,672 A | * | 12/1998 | Lu | 382/154 |
| 6,380,732 B1 | * | 4/2002 | Gilboa | 702/153 |

* cited by examiner

*Primary Examiner*—Gregory J Toatley, Jr.
*Assistant Examiner*—Iyabo S Alli
(74) *Attorney, Agent, or Firm*—Manatt Phelps & Phillips LLP

(57) ABSTRACT

A method is presented that allows multiple devices for generating three dimensional surface models of moving objects to be used simultaneously. A timing pattern is used to control and trigger the devices in order to operate seven of the devices without interference. In one embodiment, a method of employing optical filters is also described that then allows operation of forty nine of the devices at the same time if the normal visible spectrum is to be used for simultaneous video acquisition. In another embodiment, if no simultaneous video acquisition is required, the optical filtering technique can support up to one hundred fifty four imaging devices operating simultaneously.

22 Claims, 5 Drawing Sheets

METHOD FOR SYNCHRONIZING THE OPERATION OF MULTIPLE DEVICES FOR GENERATING THREE DIMENSIONAL SURFACE MODELS OF MOVING OBJECTS

BACKGROUND OF THE INVENTION

1. Field of the Invention

The invention relates generally to apparatus and methods for generating three dimensional surface models of moving objects, and more particularly to using multiple devices simultaneously to generate three dimensional surface models.

2. Background of the Invention

The generation of three dimensional models of moving objects has uses in a wide variety of areas, including motion pictures, computer graphics, video game production, human movement analysis, orthotics, prosthetics, surgical planning, sports medicine, sports performance, product design, surgical planning, surgical evaluation, military training, and ergonomic research.

Two existing technologies are currently used to generate these moving 3D models. Motion capture techniques are used to determine the motion of the object, using retro-reflective markers such as those produced by Motion Analysis Corporation, Vicon Ltd., active markers such as those produced by Charnwood Dynamics, magnetic field detectors such as those produced by Ascension Technologies, direct measurement such as that provided by MetaMotion, or the tracking of individual features such as that performed by Peak Performance, SIMI. While these various technologies are able to capture motion, nevertheless these technologies do not produce a full surface model of the moving object, rather, they track a number of distinct features that represent a few points on the surface of the object.

To supplement the data generated by these motion capture technologies, a 3D surface model of the static object can be generated. For these static objects, a number of technologies can be used for the generation of full surface models: laser scanning such as that accomplished by CyberScan, light scanning such as that provided by Inspeck, direct measurement such as that accomplished by Direct Dimensions, and structured light such as that provided by Eyetronics or Vitronic.

While it may be possible to use existing technologies in combination, only a static model of the surface of the object is captured. A motion capture system must then be used to determine the dynamic motion of a few features on the object. The motion of the few feature points can be used to extrapolate the motion of the entire object. In graphic applications, such as motion pictures or video game production applications, it is possible to mathematically transform the static surface model of the object from a body centered coordinate system to a global or world coordinate system using the data acquired from the motion capture system.

To enhance a system that produces a model of the surface of a three dimensional object, with the object possibly in motion and the object possibly deforming in a non-rigid manner, there exists a need for a method for operating multiple devices simultaneously. One problem to address relates to potential interference between multiple devices in operation: an imaging device that projects a pattern onto one aspect of an object and then observes that pattern with the goal of estimating the three dimensional surface may be thwarted if a second device is also projecting a pattern onto that surface. In order to successfully operate multiple devices on one object, the present invention disclosed a novel method for operating multiple devices without interference.

BRIEF DESCRIPTION OF THE DRAWINGS

The drawings illustrate the design and utility of preferred embodiments of the invention, in which similar elements are referred to by common reference numerals and in which.

DETAILED DESCRIPTION

Figure 1:
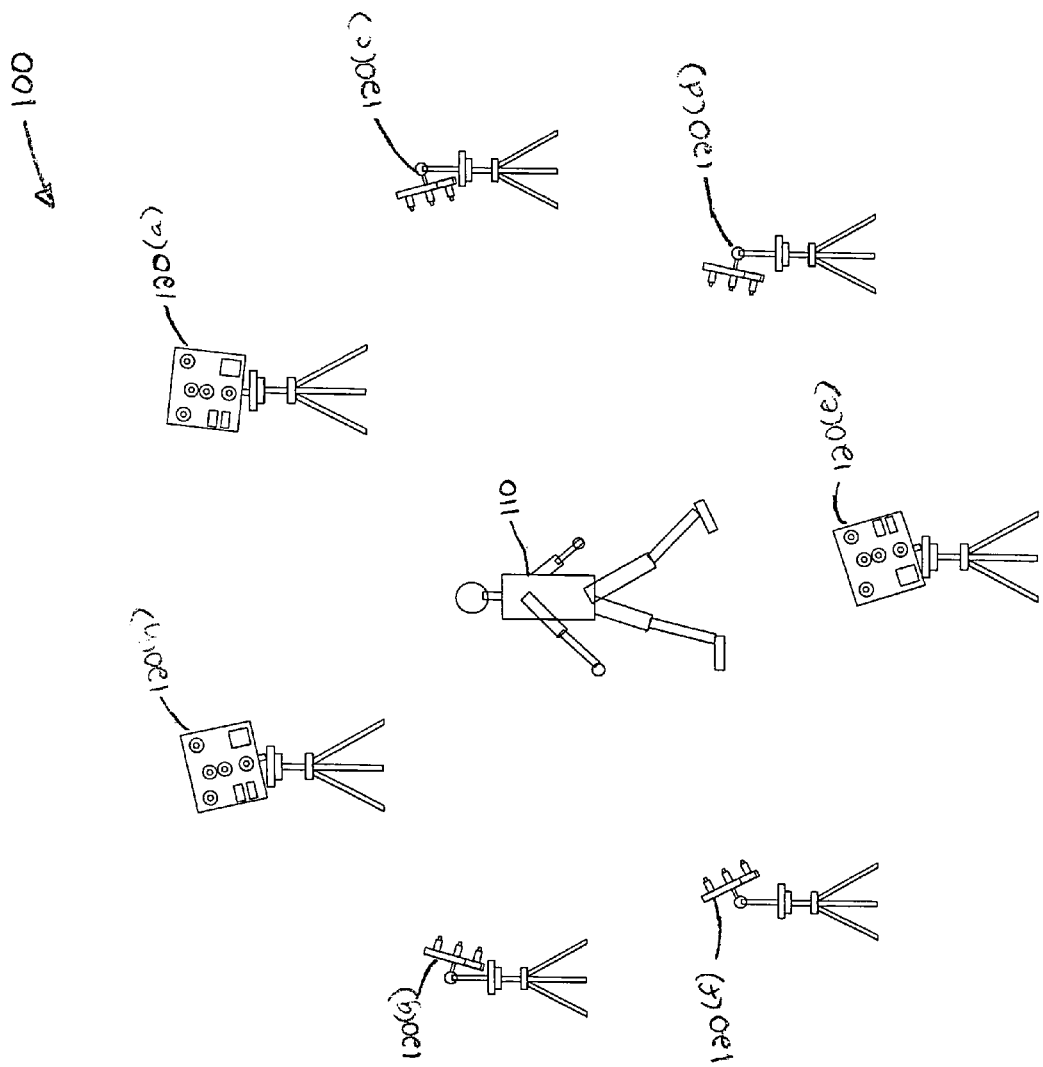
FIG. 1 is a side view of a subject moving while multiple imaging devices are trained on the subject.

Various embodiments of the invention are described hereinafter with reference to the figures. It should be noted that the figures are not drawn to scale and elements of similar structures or functions are represented by like reference numerals throughout the figures. It should also be noted that the figures are only intended to facilitate the description of specific embodiments of the invention. The embodiments are not intended as an exhaustive description of the invention or as a limitation on the scope of the invention. In addition, an aspect described in conjunction with a particular embodiment of the invention is not necessarily limited to that embodiment and can be practiced in any other embodiment of the invention.

Turning to the drawings, FIG. 1 shows a laboratory 100 where a subject 110 is moving through the laboratory 100 while multiple imaging devices 120(a-h) are trained on the subject 110. The imaging device is a device that is capable of producing a three dimensional representation of the surface of one aspect of a three dimensional object such as the device described in U.S. patent application Ser. No. pending entitled Device for Generating Three Dimensional Surface Models of Moving Objects, filed concurrently with the present patent application on Oct. 4, 2006, which is incorporated by reference into the specification of the present patent application in its entirety. Such an imaging device has a mounting panel. Contained within the mounting panel of the imaging device are grey scale digital video cameras. There may be as few as two grey scale digital video cameras and as many grey scale digital video cameras as can be mounted on the mounting panel. The more digital video cameras that are incorporated, the more detailed the model generated. The grey scale digital video cameras may be time synchronized. The grey scale digital video cameras are used in pairs to generate a 3D surface mesh of the subject. The mounting panel may also contain a color digital video camera. The color digital video camera may be used to supplement the 3D surface mesh generated by the grey scale camera pair with color information.

Each of the video cameras has lenses with electronic zoom, aperture and focus control. Also contained within the mounting panel is a projection system. The projection system has a lens with zoom and focus control. The projection system allows an image, generated by the imaging device, to be cast on the object of interest, such as an actor or an inanimate object.

Control signals are transmitted to the imaging device through a communications channel. Data is downloaded from the imaging device through another communications channel. Power is distributed to the imaging device through a power system. The imaging device may be controlled by a computer.

The multiple imaging devices 120(a-h) are controlled remotely by a computer (not shown), for example a laptop, desktop or workstation. Each imaging device 120(a-h) has at least one camera and a projector. As the subject 110 walks through the laboratory 100, the yaw, side to side movement (as shown by imaging devices 120(a), 120(h) and 120(e)), the pitch, inclination (as shown by imaging devices 120(c), 120 (d), 120(f) and 120(g)) and roll, circular movement (not shown) of the imaging heads changes in order to stay focused on the subject 110. In addition to controlling the yaw, pitch and roll of each of the individual imaging devices 120(a-h), the focus, zoom and aperture of the grey-scale cameras and the focus, zoom and aperture of the projector are also controlled. All these controlled signals are transmitted to the individual imaging devices 120(a-h)—either by a direct cable link to the computer or through a wireless network connection to the computer.

In operation for each individual time frame, the focus, zoom and aperture of the projector is set to focus on an area in three-dimensional space where the subject 110 is expected to be for this time frame. As the image is projected on the subject 110, one control signal is sent to the camera to acquire an image. This image is recorded and that information is stored and may be further processed.

Figure 2:
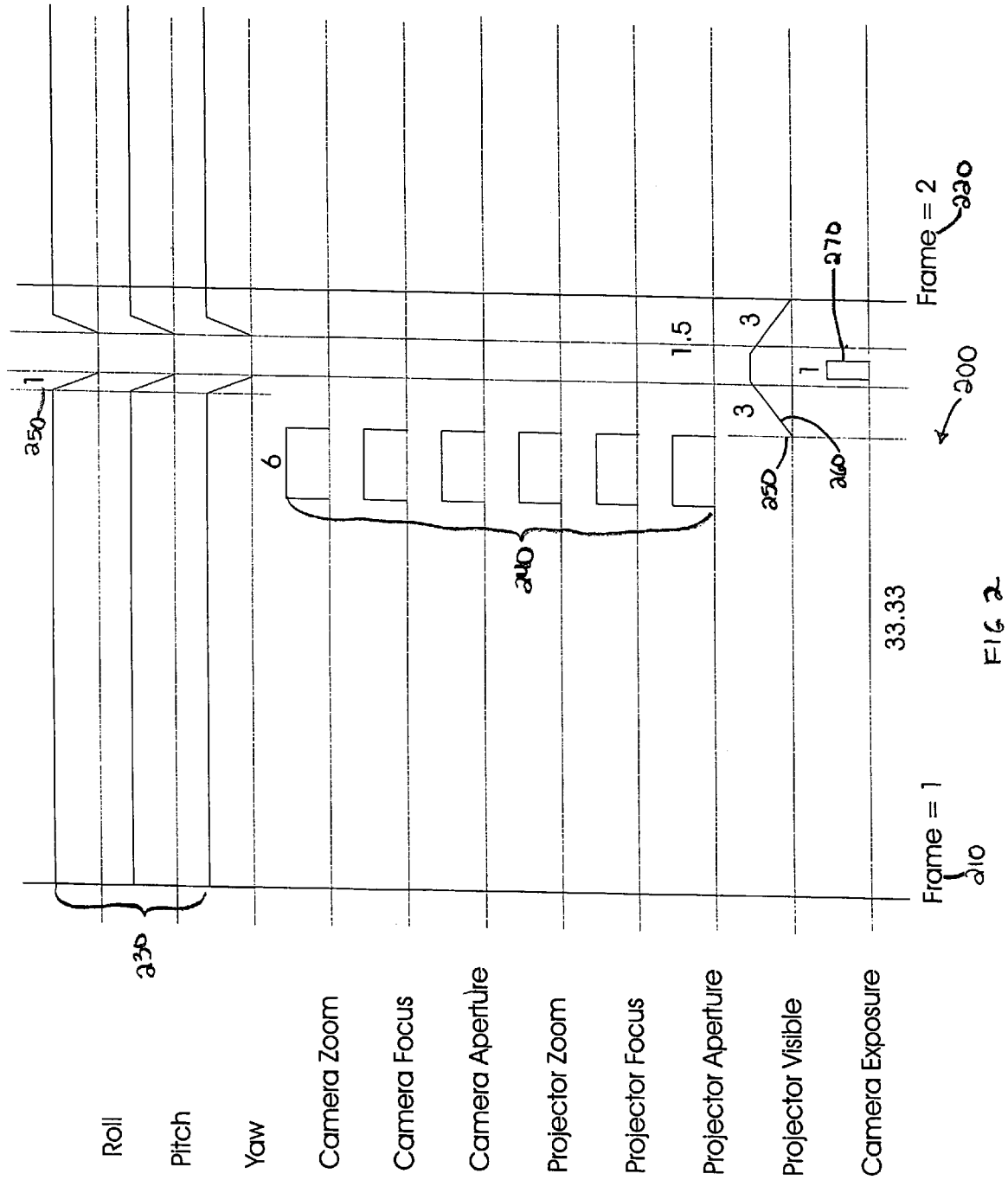
FIG. 2 is a representation of the timing signal for one imaging device.

FIG. 2 is a representation of the timing signal 200 for an individual imaging device control. At the initiation of frame 1 210, a signal 230 controlling the roll, pitch and yaw of the imaging device is sent out to the device from the controlling computer. At some time between frame 1 210 and the next frame, the camera zoom, focus and aperture controls signals 240 are sent in addition to the projector control zoom, focus and aperture signals 240. At some time 250 prior to the initiation of frame 2 220, the control signals for the roll, pitch and yaw of the imaging device initiate a downturn and go to zero. Simultaneously with the initiation of the downturn of the roll, pitch and yaw accelerators, the projector visible signal 260 is initiated and sent to the projector. This signal opens the mechanical aperture device on the projector.

The projector aperture then stays in the completely open position for a short time interval longer than the camera exposure time interval 270. For example, if the camera exposure is expected to be one millisecond, the projector visible signal will be on high for 1.5 milliseconds. On completion of the camera exposure, the projector visible signal 260 is then turned from on to off. The system is then ready for the next frame of data.

Figure 3:
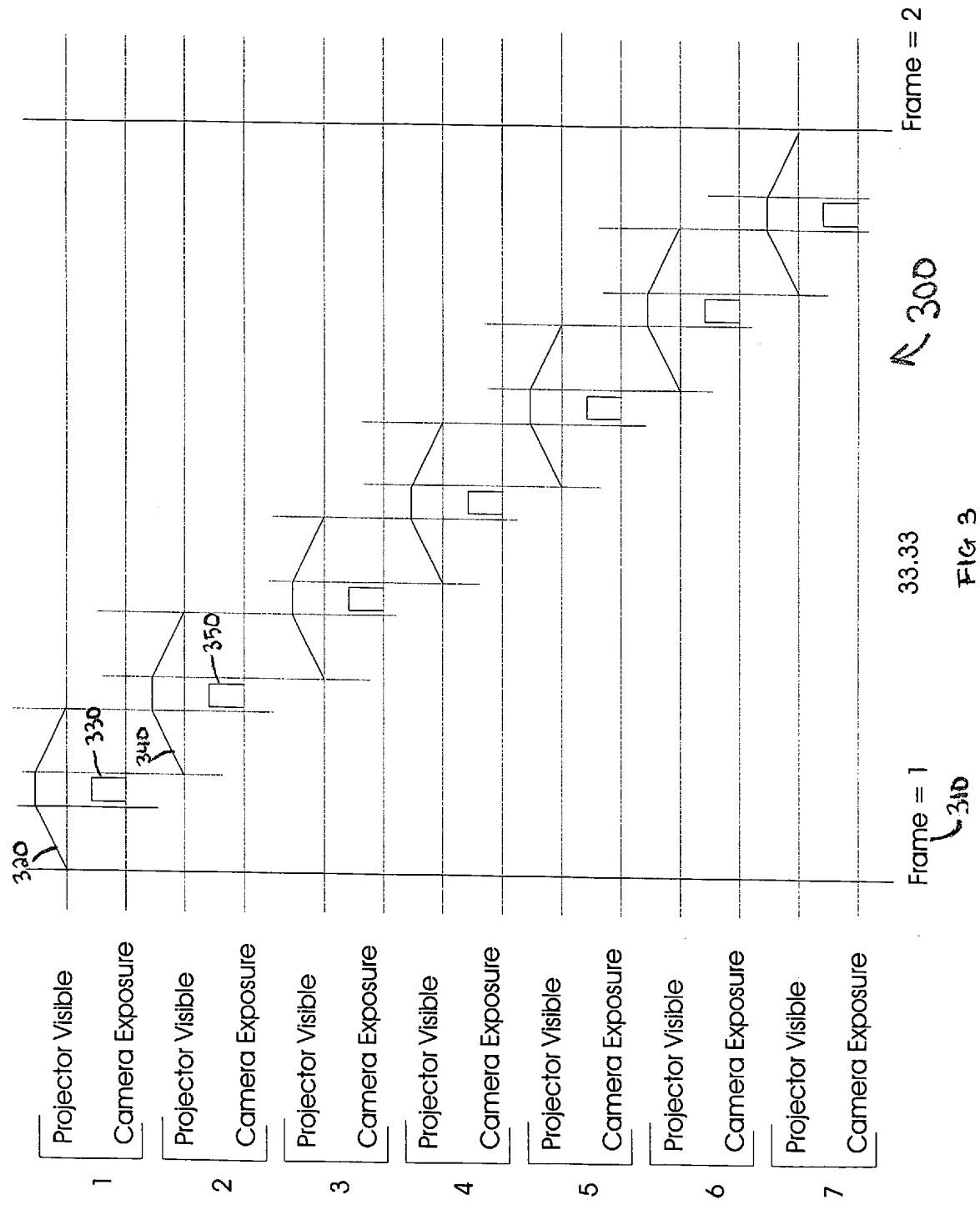
FIG. 3 is a representation of the camera exposure and projector interval control signals when seven imaging devices are used.

FIG. 3 shows the camera exposure and projector interval control signals 300 when seven imaging devices are being controlled by a single computer. At the initiation of frame 1 310, the projector visible signal 320 goes from zero towards one, over a time period of approximately three milliseconds. The projector visible signal stays high while the camera exposure 330 is on. For example, a one-millisecond exposure would lead to a 1.5-millisecond projector visible signal. The projector visible signal is then turned off and proceeds back towards zero. On the initiation of Camera 1's turn-off signal for the projector visible signal, Camera 2 projector visible signal 340 goes from zero towards a high level. Again, the projector visible signal stays high while Camera 2 exposure signal 350 is on. At the end of Camera 2's exposure, projector 2 visible signal goes back toward zero. This process can be seen in FIG. 3, as repeated for each of the individual cameras. At no time is there any overlap between one projector being on and another projector being on.

At a standard 30-hertz signal acquisition frequency, 33.33 milliseconds are available between individual time frames. With a three-millisecond on and a three-millisecond off and 1.5 millisecond exposure time, seven imaging devices can be used with one time synchronization controller. Two exemplary methods that may be used to operate the imaging devices without interference are disclosed. In the one, a fixed number of imagers at the same optical frequency are operated; this may be referred to as the time division approach. In the second, the imagers are operated at other optical frequencies; this may be referred to as the frequency division approach. The two approaches may be combined. For example, 7 imagers at the same optical frequency can be operated by time division. If three optical frequencies are then selected, 21 imaging devices can be operated without interference. The operation of the multiple imagers at various frequencies may be referred to as the frequency division approach.

In the time division approach, some sub-set of the system operates on a time sharing basis to operate without interference. This sub-set can be repeated if it operates at another optical frequency, or in other words, on a frequency sharing basis.

For example, if 30 camera frames per second are utilized with 1 msec exposure, 3 msec aperture time, 7 imaging devices can operate on a time sharing basis as illustrated by the following formula:

$$T=(1/\text{camera frequency})>=(\text{Time division imager count})\times(\text{exposure time}+\text{aperture time})+\text{aperture time}$$

Or $$\text{Time division imager count}=\text{Floor}([T-\text{aperture time}]/[\text{exposure time}+\text{aperture time}])$$

As illustrated above the exposure time and aperture speed determine the number of devices that can be operated under this time division approach. When cameras with shorter exposure time and/or faster aperture speeds are used, more than seven cameras can be operated without interference using this time division approach. The number of imagers used in any given implementation is known as the time division imager count.

Figure 4:
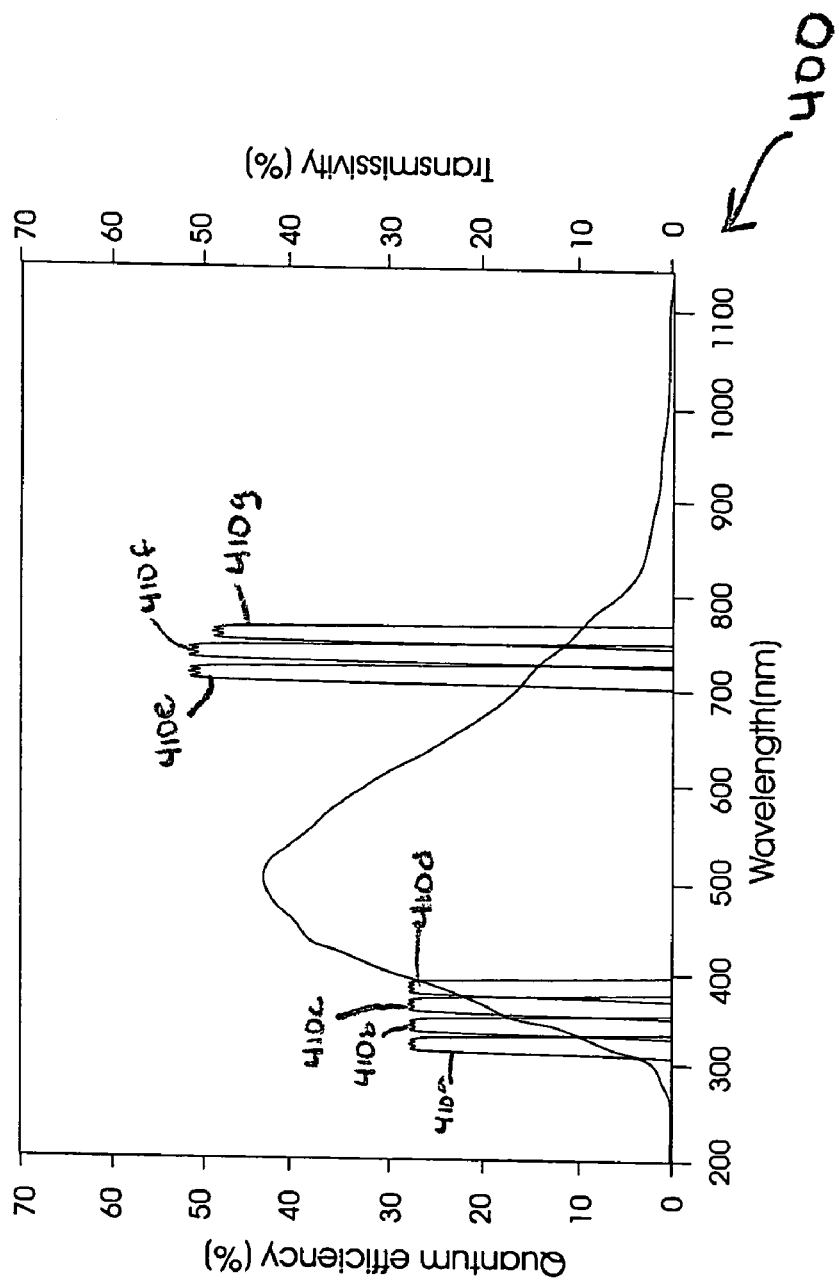
FIG. 4 is a graphical representation of the quantum efficiency and transmissivity of a standard CCD receiver as a function of the wavelength, showing the placement of optical filters to avoid interference with the visible spectrum for television.

This embodiment of the invention is equally applicable when more than seven imaging devices (or more than the time division imager count) are used. In order to use more imagers than the time division imager count simultaneously, an optical filtering system is employed. FIG. 4 is a graphical representation of the quantum efficiency and transmissivity of a standard charge-coupled device ("CCD") receiver as a function of the wavelength 400, showing the placement of the optical filters 410(a-g) to avoid interference with the visible spectrum for television. As seen in FIG. 4, the quantum efficiency of a standard CCD receiver starts at about 300 nanometers, rises on a fairly steep slope up to 40% efficiency at about 400 nanometers, rises to a peak of about 45% quantum efficiency at about 500 nanometers and then begins a slow decline down to 10% quantum efficiency at around 780 nanometers. In general, high definition color television uses this full frequency range of 300-780 nanometers. Normal television usually employs a 400-700 nanometer spectrum for most color approaches.

This leaves a segment from 300-400 and from 700-780 nanometers available for use by the imaging system without interfering with a standard television camera operating simultaneously. An optical filter 410(a), at a center frequency of 330 nanometers, can be employed, which has a minimum 3 db drop-off at ±10 nanometers about the center frequency. More preferably, the optical filter has a 3 db drop-off at ±8 nanometers Using filters such as these, it is possible to slide four filters 410(*a-d*) in the 300-400 nanometer wavelength range and 3 more filters 410(*e-g*) in the 700-780 nanometer wavelength range for a total of 7 independent filtered groups. Using these frequency filters on each of, for example, the seven cameras in one timing group, it's possible to uniquely control 49 of the imaging devices simultaneously without interfering with the normal visible optical spectrum for television or film recording.

Figure 5:
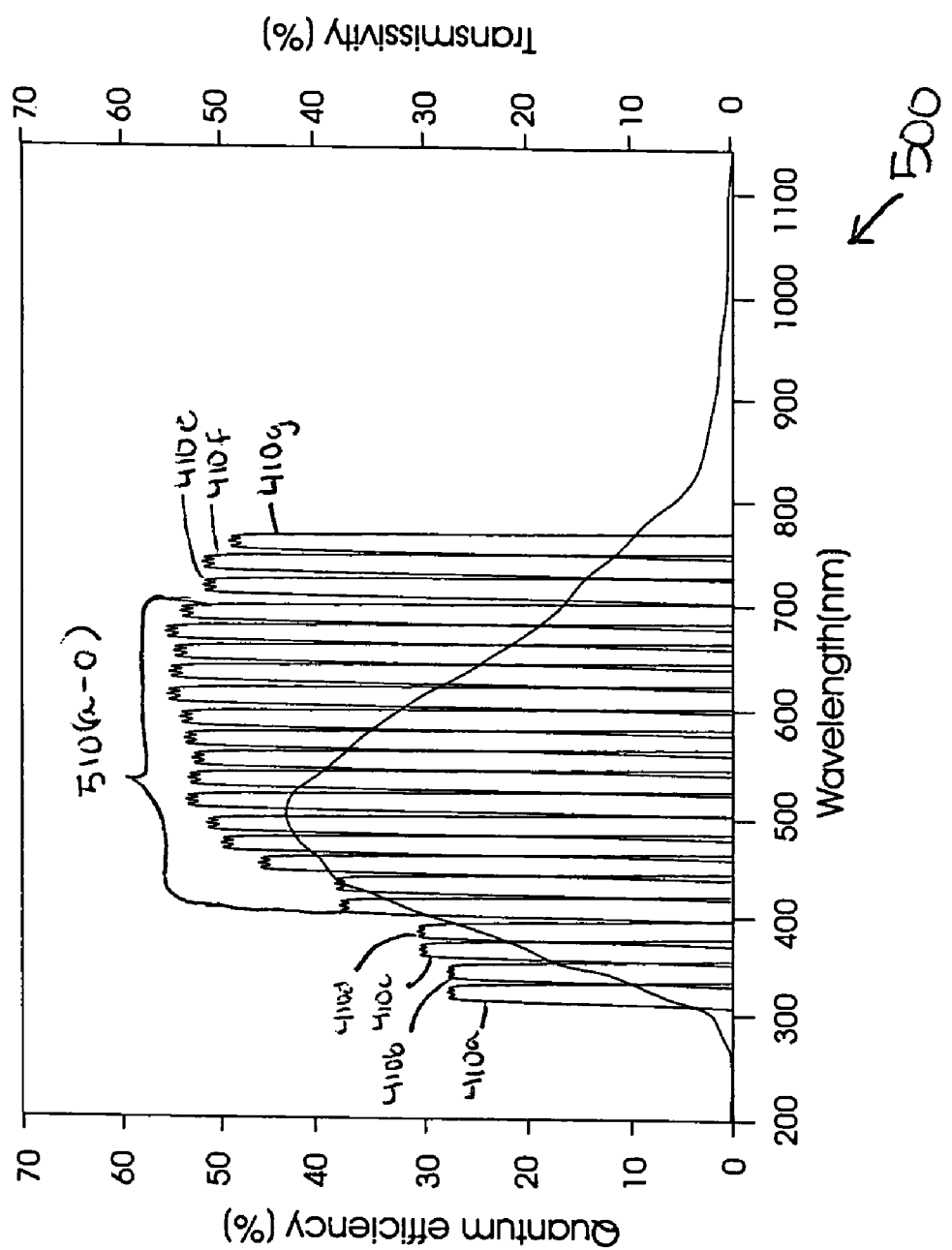
FIG. 5 is a graphical representation of the quantum efficiency and transmissivity of a standard CCD receiver as a function of the wavelength, showing the placement of optical filters when it is not necessary to simultaneously record in the visible spectrum for television.

However, it may not be the case that it is necessary to simultaneously be able to record in the visible spectrum for television or film. If so, it is possible to include fifteen more filtered segments in the normally used optical range as shown in FIG. 5. FIG. 5 is a graphical representation of the quantum efficiency and transmissivity of a standard CCD receiver as a function of the wavelength, showing the placement of the optical filters 500. Using the fifteen additional filtered segments 510(*a-o*) results in a total of 22 individually filter-based controls, and this configuration allows for a total of 154 individual imaging devices that can be controlled simultaneously without interfering with each other, with a time division imager count of 7 used as a concrete example. While the present embodiment utilizes twenty-two optical filters, one of skill in the art will appreciate that this number of optical filters is not intended to be a limitation on the number of optical filters that may be employed. For example if an optical filter having a narrower passband is used, for example an filter with a 3 bd drop at ±8 nanometers additional imaging devices could be implemented, for example, seven additional imaging devices. In addition, if the mechanical aperture speed of the imaging device is increased, additional imaging devices may be utilized.

The ability to control all of these individual imaging devices simultaneously without interference means that multiple devices that can capture a three-dimensional surface model of one aspect of an object moving within the field of view can now be employed simultaneously.

As noted previously the forgoing descriptions of the specific embodiments are presented for purposes of illustration and description. They are not intended to be exhaustive or to limit the invention to the precise forms disclosed and obviously many modifications and variations are possible in view of the above teachings. The embodiments were chosen and described in order to explain the principles of the invention and its practical applications, to thereby enable those skilled in the art to best utilize the invention and various embodiments thereof as suited to the particular use contemplated. It is intended that the scope of the invention be defined by the following claims and their equivalents.

The embodiments described herein have been presented for purposes of illustration and are not intended to be exhaustive or limiting. Many variations and modifications are possible in light of the forgoing teaching. The system is limited only by the following claims.

What is claimed:

1. A method for generating three dimensional surface models of an object, comprising:
    controlling at least four imaging devices simultaneously;
    operating the at least four imaging devices simultaneously on a time sharing basis without interference;
    projecting an image on an object; and
    acquiring an image projected on the object.

2. The method of claim 1, wherein the object is a moving object.

3. The method of claim 1, wherein the imaging devices are three dimensional imaging devices.

4. The method of claim 1, wherein the acquired image is a three dimensional surface mesh models of various aspects of the object.

5. The method of claim 1, wherein the imaging devices are time synchronized so as to operate without interfering with each other.

6. The method of claim 2, wherein the moving object is a mammal.

7. The method of claim 1, wherein controlling the imaging devices is performed remotely.

8. The method of claim 1, further comprising utilizing an optical filtering technique for operating the imaging devices simultaneously without interference.

9. The method of claim 8, wherein the optical filtering technique comprises using a frequency filter.

10. The method of claim 9, wherein at least seven frequency filters are used.

11. The method of claim 9, wherein frequency filters are used outside the 400-700 nm visible spectrum.

12. A system for generating three dimensional surface models of an object, the system comprising:
    a means for controlling at least four imaging devices simultaneously;
    a means for operating the at least four imaging devices simultaneously on a time sharing basis without interference;
    a means for projecting an image on an object; and
    a means for acquiring an image projected on an object.

13. The system of claim 12, wherein the object is a moving object.

14. The system of claim 12, wherein the imaging devices are three dimensional imaging devices.

15. The system of claim 12, wherein the acquired image is a three dimensional surface mesh models of various aspects of the object.

16. The system of claim 12, wherein the imaging devices are time synchronized so as to operate without interfering with each other.

17. The system of claim 12, wherein controlling the imaging devices is performed remotely.

18. The system of claim 12, further comprising utilizing an optical filtering technique for operating the imaging devices simultaneously without interference.

19. The system of claim 18, wherein the optical filtering technique comprises using a frequency filter.

20. A system for generating a surface model of an object comprising:
    at least four imaging devices, each comprising at least one camera and a projector;
    the at least four imaging devices configured to operate simultaneously on a time sharing basis without interference;
    the projector configured to project an image on an object; and
    the camera configured to acquire an image projected on an object.

21. The system of claim 11, further comprising an optical filter.

22. A computer readable medium storing a computer program implementing the method of generating three dimensional surface models of an object, comprising:
    controlling at least four imaging devices simultaneously;
    operating the at least four imaging devices simultaneously on a time sharing basis without interference;
    projecting an image on an object; and
    acquiring an image projected on the object.

* * * * *